United States Patent Office 3,481,139
Patented Dec. 2, 1969

3,481,139
ASSEMBLY FOR SECURING THE INNER END OF A COILED BALANCE SPRING TO A BALANCE STAFF
Marcel Dumont and Gabriel Fahndrick, both of 9 Rue du Chantier, 2500 Bienne, Switzerland
Continuation-in-part of application Ser. No. 544,147, Apr. 21, 1966. This application June 13, 1968, Ser. No. 736,679
Claims priority, application Switzerland, Apr. 21, 1965, 5,513/65
Int. Cl. G04b 17/32
U.S. Cl. 58—115                    6 Claims

ABSTRACT OF THE DISCLOSURE

This disclosure concerns an assembly for securing the inner end of a coiled balance spring to the balance staff of a timepiece which consists in a pair of ring-like elements driven on the staff and gripping opposing edges of a part of the length of the inner end of the spring. In a modification at least one of the elements has guiding means which maintain the spring laterally on at least a part of its length comprised between the two elements.

---

This application is a continuation-in-part of our our previous application Ser. No. 544,147, filed on April 21, 1966, now Patent No. 3,408,807.

The invention is concerned with a device for securing a timepiece balance to the balance staff.

In order to secure the balance spring to the balance staff, there is used usually a collet formed by a brass crown driven on the staff. The inner end of the spring is made rigid with this crown by the gripping in a common hole of its end and of a conical pin or by gluing in a groove or a slot, which may be spiral shaped. The collect is provided with an elastic radial slot permitting its movement on the staff.

This construction has many drawbacks. The weight of the brass collet is relatively great and goes against the desired goal of having as little weight as possible near the balance. The presence of an elastic slot requires balancing of the collet. The centring of the spring becomes difficult and the automatising of the assembly presents great difficulties.

In addition to this solution, it has already been proposed to mould the collet on the inner end of the spring. To this effect, the extremity of the spring is introduced in a mould, and one pours therein a low density material, for example, a plastic material. In this manner, it is relatively easy to make a plastic collet. It is however necessary to employ a mould having very exact dimensions and to exactly centre these springs with respect to the mould, a very delicate operation. In order to avoid these drawbacks, it has already been suggested to eliminate the moulds by pouring the plastic material directly in the centre of the spring in order to form a hub which then can be secured to the balance staff. This process has the advantage of requiring less precision of fabrication than that required for the making of brass collets or of plastic collets moulded in an auxiliary mould. It is no longer necessary to poise the assembly since the elatsic slot has been eliminated, the entire mass deforming itself elastically when the collet is forced on the staff and the plastic material having a relatively low specific weight; the weight of the collet being distributed practically uniformly around the staff.

The present invention has for its object to provide an asembly for securing a balance spring to the balance staff of a timepiece which assembly has all the advantages of a collet moulded in the spring, and is more simplified, the plastic collet embedding the inner coil of the balance spring being eliminated.

According to one feature of the invention, the balance spring is maintained between two elements force-fitted on the staff, the elements bearing on one part and the other on opposite portions of a part of a length of the inner end of the blade forming the balance spring staff.

According to another characteristic of the invention, at least one of the securing elements has guiding means maintaining laterally the balance spring along at least a part of its length between said securing elements.

Other advantages and characteristics of the invention will appear during the description of certain embodiments thereof, given by way of non limiting example, in conjunction with the annexed drawing, wherein.

Figure 1:
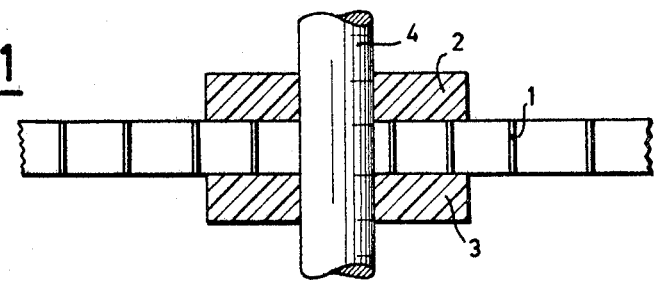
FIGURE 1 is a cross sectional view of the first embodiment.
Figure 2:
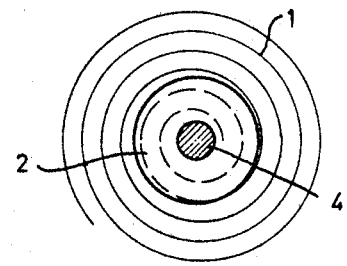
FIGURE 2 is a plan view of the device shown on FIGURE 1.

In the assembly shown on FIGURE 1, balance spring 1 is secured by squeezing between two plastic rings 2 and 3. These two rings are perforated in their centre by a cylindrical hole having a diameter slightly less than the diameter of balance staff 4, so as to make possible their being force fitted on this staff. FIGURE 2 shows circular rings, but it may be advantageous to use rings having an outer shape such that they determine precisely the setting point of the balance spring to the collet, and that they facilitate the placing into beat of the balance spring-balance assembly, thereby giving a better hold to the tool with which the rings are turned on staff 4, by turning balance spring 1 at the same time. The plastic material used for making these rings can be either polyethylene, an epoxy resin mixed with a hardener or other similar material. Instead of being force fitted on staff 4, rings 2 and 3 can also be glued thereon. The pressure exerted by the opposed faces of rings 2 and 3 on the part of the balance springs comprised between these rings, naturally must suffice to prevent all movement of the balance spring with respect to these rings. The balance spring is squeezed along approximately one coil and a half. The plastic material forming rings 2 and 3 being elastically deformable, the portions of the blade of the balance spring will enter slightly in the opposing faces of these two rings. It is also possible to glue the balance spring on the faces of the two rings, or to combine gluing and pressure. Preferably ring 3 will have a given thickness and will bear on the balance or on a shoulder of the balance staff, determining the working height of the spiral for a given caliber.

To secure the balance spring to a given balance staff, it will be enough then to select a suitable ring 2 which will be combined with the ring 3 of suitable height.

Figure 3:
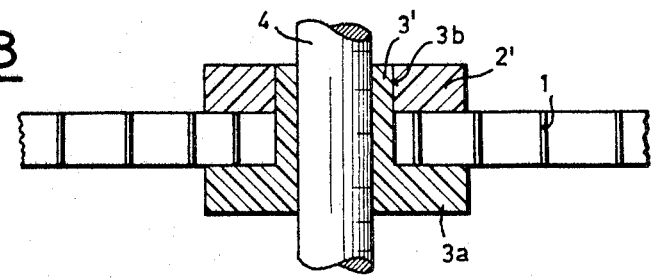
FIGURE 3 is a cross sectional view of a second embodiment.

FIGURE 3 shows a second embodiments affording the possibility of providing the balance spring already united with its securing device, which is not the case for the example shown on FIGURE 1. In this embodiment, the plastic ring is not directly driven on the staff, but driven or glued on the end 3b of a plastic bushing 3 the other end of which has a shoulder 3a forming the other gripping elements for balance spring 1, the securing of the balance spring between ring 2 and shoulder 3a taking place in the same manner as in the example of FIGURE 1. The height of shoulder 3a determines the working height of balance spring 1 with respect to the balance. In this example, it suffices to drive or to glue sleeve 3' on the balance staff. The outer surface 3b of sleeve 3' need not necessarily be cylindrical but can on the contrary have a surface such as to prevent all angular movement of ring 2' with respect to the shoulder 3a.

Ring 2' can have a form such as to facilitate the putting into beat of the assembly and to determine precisely the setting point of the balance spring to the collet. The device naturally can be mounted in a position inverted by 180° with respect to the position shown in FIGURE 3, the height of shoulder 3a determining then the working height of the balance spring 1. Shoulder 3a preferably will have a shape such as to facilitate the putting into beat of the assembly by moving angularly bush 3' with respect to balance staff 4.

Since the principle of operation of the device consists in squeezing the balance spring between two opposite parallel faces, it follows that one of these surfaces can be made integral with the balance staff.

Figure 4:
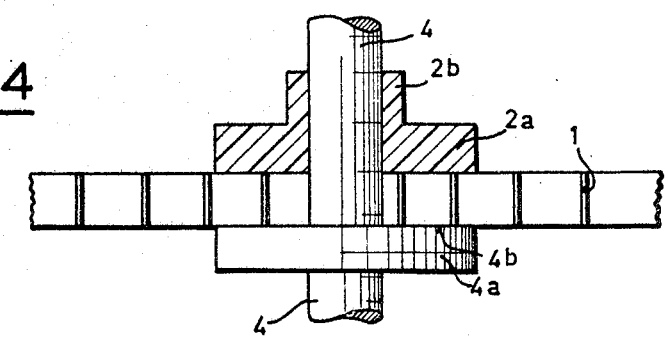
FIGURE 4 is a cross sectional view of a third embodiment.

FIGURE 4 shows such an embodiment in which the balance staff has a shoulder 4a made integrally therewith, balance spring 1 being secured by a bush 2b terminating in a drum 2a pressing on the balance spring. This latter device natural affords great stability to the balance spring owing to the rigidity of the surface 4b of the metallic shoulder 4a and the large contact surface between the bush and the staff 4.

Utilisation of a plastic material of course makes possible the use of rings of various colours.

The rings can be insulating, or may be made electrically conductive by adding thereto metallic powders or by metallising their surfaces so as to use them in electro-mechanical watches.

The rings and the bushes can be made of thermoplastic resins or thermosetting resins, with or without a hardener.

Before securing the balance spring between the two clamping faces, the spring is centered by means of a suitable device. Such a device can consists in a fitting having a plate with a housing intended to receive the lower securing ring, and centering pins disposed around the housing and able to engage between two consecutive turns of the spring to center the same.

Said housing can also be made in the bottom of a second housing having an inner diameter arranged within the inner diameter of the first housing, the second housing or bed being provided with a very thin wall interrupted in at least one place, so as to permit the partial insertion of the main spring into its barrel by means of a main spring winder, the walls of this second housing or bed introducing itself between two consecutive turns of the spring.

The described securing devices permit, in spite of their great simplicity, to provide an assembly sufficiently secure of the balance spring to the balance staff, the horizontal stability of the balance spring being very great owing to the fact that at least one turn of the balance spring is rigidly maintained.

Figure 5:
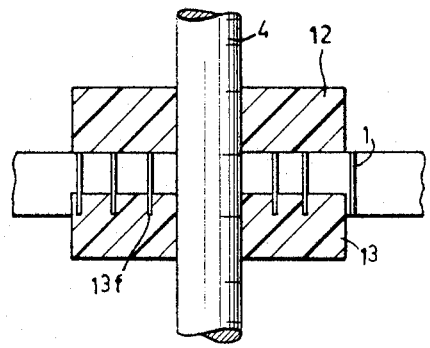
FIGURE 5 is a cross sectional view of a fourth embodiment.

In the securing device shown in FIGURE 5, the balance spring 1 is maintained between two rings 12 and 13 driven on staff 4 as described above. The lower ring has a spiral shaped groove 13f in which is placed without stress balance spring 1. The balance spring being guided and laterally held by the groove, ring 12 need now only ensure its axial position, and owing to this fact, the pressure exerted on the portions of the main spring on the two securing rings can be kept down to a very low value; all the more since groove 13f can have a sufficient depth to guide the spring along the greater part of its height. The depth of the groove must not exceed the height of the balance spring. With respect to the materials which can be used to make these rings, it is possible to use either metal or plastic or any other material as long as the conditions required by the invention are fulfilled.

Figure 6:
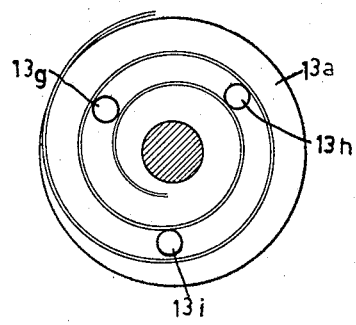
FIGURE 6 is a plan view of a fifth embodiment.

In the embodiment shown on FIGURE 6, the guiding elements are formed by three studs 13g, 13h and 13i spirally distributed around the staff of the device; the diameter of the studs being equal to the distance between two consecutive coils of the spring. These studs are disposed in such a way that they can introduce themselves between the turns of the balance spring without stressing the same. These studs preferably in a number greater than three, can be grouped in rows in the same manner as the heads in FIGURE 6.

In the embodiment shown in FIGURE 6, the guiding elements preferably are made integrally with element 13 and can be greater than 3. Additionally, the two securing rings can be provided with the said guiding elements.

Returning to the embodiment shown on FIGURE 4, it is also possible to combine one ring, made for example in plastic, with a shoulder made integrally with the staff, the guiding means, whether it be a groove, heads or cylindrical studs, which can be provided either on the plastic ring or on the metallic shoulder of the staff.

In all the examples described above, guiding means made of a sufficient height, suffice practically to secure the balance spring. But since these guiding means are provided for cooperating with the securing rings, it is sufficient to provide guiding elements which bear on only one face of the spring blade. For example, instead of pairs of heads shown in FIGURE 6, it will suffice to only provide outer lugs.

Accordingly many variations are possible both in the form, number of the guiding element and in the choice of materials used.

What is claimed is:

1. In a timepiece, the combination of a balance staff, a balance spring comprising a spiral spring blade surrounding said staff in a plane perpendicular thereto and having a plurality of convolutions including an inner convolution adjacent said staff, and a pair of rings fixed on said shaft and gripping said inner convolution of said spring between them, at least one of said rings being of elastic deformable material into the surface of which the blade of the balance spring enters slightly to form a spiral groove guiding and retaining said inner convolution of said spring to secure said spring to said staff.

2. In a timepiece, a combination according to claim 1, in which one of said rings consists of a bushing having an upper sleeve portion fitting around said staff and a lower shoulder portion and the other said ring is rigidly secured on said sleeve portion, said inner convolution of said spring being held in place between said shoulder and said other ring.

3. In a timepiece, a combination according to claim 1, in which at least one of said rings has a preformed spiral groove in which said inner convolution of said spring is received to guide and hold said spring.

4. In a timepiece, a combination according to claim 1, in which studs on the inner face of at least one of said rings are received between consecutive convolutions of said spring to guide and hold said spring.

5. In a timepiece, a combination according to claim 1, in which at least one said ring of deformable material has a central cylindrical bore which in free condition is of a diameter slightly less than the diameter of said staff, said ring being force fitted on said staff.

6. In a timepiece, a combination according to claim 5, in which both of said rings are of said deformable material and are force fitted on said staff.

References Cited

UNITED STATES PATENTS

| | | | |
|---|---|---|---|
| 438,672 | 10/1890 | Banta | 58—115 |
| 975,697 | 11/1910 | Lange | 58—115 |
| 2,649,684 | 8/1953 | Dolby | 58—115 |
| 2,842,935 | 7/1958 | Bradley | 58—115 |

FOREIGN PATENTS 373,698   1/1964   Switzerland.

RICHARD B. WILKINSON, Primary Examiner

S. A. WAL, Assistant Examiner